United States Patent [19]

Drake et al.

[11] 4,147,636
[45] Apr. 3, 1979

[54] FLAMEPROOFING COMPOSITIONS COMPRISING A TRIESTER OF PHOSPHOROUS PHOSPHORIC OR THIOPHOSPHORIC ACID AND A HALOALKYL ARYL ETHER

[75] Inventors: William O. Drake, Therwil; Hans-Werner Finck; Horst Mayerhoefer, both of Oberwil; Wolfgang H. Mueller, Neuallschwil, all of Switzerland

[73] Assignee: Sandoz Ltd., Basel, Switzerland

[21] Appl. No.: 818,375

[22] Filed: Jul. 22, 1977

[30] Foreign Application Priority Data

Jul. 23, 1976 [CH] Switzerland ......................... 9463/76
Apr. 27, 1977 [CH] Switzerland ......................... 5217/77
May 11, 1977 [CH] Switzerland ......................... 5890/77

[51] Int. Cl.$^2$ .............................................. C09K 3/28
[52] U.S. Cl. .................................. 252/8.1; 106/15.05; 428/921
[58] Field of Search ................... 252/8.1; 106/15 FP; 428/921

[56] References Cited

U.S. PATENT DOCUMENTS 4,013,813   3/1977   Le Blanc et al. ................. 252/8.1 X

*Primary Examiner*—Stephen J. Lechert, Jr.
*Attorney, Agent, or Firm*—Gerald D. Sharkin; Richard E. Vila; Joseph J. Borovian

[57] ABSTRACT

Flameproofing composition comprises an O,O,O-triester of phosphorus, phosphoric or thiophosphoric acid and a haloalkyl aryl ether, and optionally a chlorinated aliphatic hydrocarbon and/or an organic tin or lead compound. The composition is useful for flameproofing polymeric organic materials, especially synthetic polymeric organic materials such as polypropylene, which may alternatively be flameproofed by treatment separately with the individual components of the composition.

34 Claims, No Drawings

FLAMEPROOFING COMPOSITIONS COMPRISING A TRIESTER OF PHOSPHOROUS PHOSPHORIC OR THIOPHOSPHORIC ACID AND A HALOALKYL ARYL ETHER

The present invention relates to flameproofing compositions and their use in the flameproofing of polymeric organic materials.

According to the present invention there is provided a flameproofing composition comprising (a) a compound of formula I,

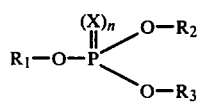

in which, $R_1$ is $(C_{1-18})$alkyl;$(C_{5-8})$cycloalkyl; phenyl; phenyl-$(C_{1-4})$alkyl; phenyl or phenyl-$(C_{1-4})$alkyl substituted on the phenyl nucleus with up to 3 halogen atoms, with up to 3 $(C_{1-12})$alkyl radicals containing a total of up to 12 carbon atoms, with up to 3 halogen atoms and an unsubstituted or $(C_{1-8})$alkyl-substituted phenyl radical, with up to 3 $(C_{1-12})$alkyl radicals containing a total of up to 12 carbon atoms and an unsubstituted or $(C_{1-8})$alkyl-substituted phenyl radical, or with an unsubstituted or $(C_{1-8})$alkyl-substituted phenyl radical; or a group of formula (a) or (b),

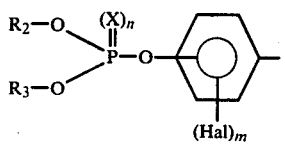

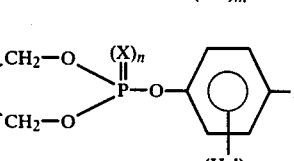

either $R_2$ has one of the significances of $R_1$,
and $R_3$ has one of the significances of $R_1$,
or $R_2$ and $R_3$, or both sets of $R_2$ and $R_3$, as appropriate, form together with the oxygen atoms to which they are attached and the common phosphorus atom a radical of formula (c), (d), or (e),

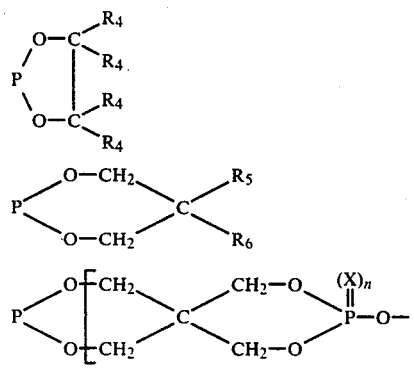

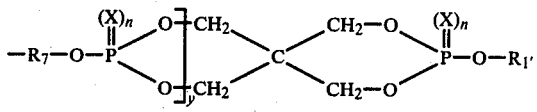

each $R_4$, independently, is hydrogen or $(C_{1-4})$ alkyl,
$R_5$ is hydrogen, $(C_{1-4})$alkyl, chloromethyl, bromomethyl or phenyl,
$R_6$ is hydrogen, $(C_{1-4})$alkyl, chloromethyl, bromomethyl or, when $R_5$ is $(C_{1-4})$alkyl, also a group of formula (f),

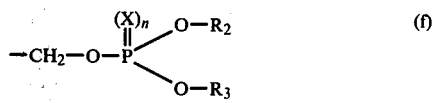

with the proviso that in any radical (d) formed by $R_2$ and $R_3$, the oxygen atoms and the phosphorus atom in the group (f), $R_6$ is only hydrogen, $(C_{1-4})$ alkyl, chloromethyl or bromomethyl, $R_1'$ has one of the significances of $R_1$, $R_7$ is straight or branched chain $(C_{2-22})$ alkylene, cyclohexylene, phenylene, $(C_{1-4})$alkylene-1,4-phenylene-$(C_{1-4})$ alkylene, or a group of formula (g), (h) or (i),

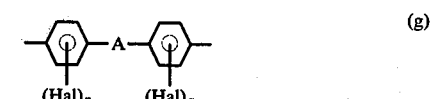

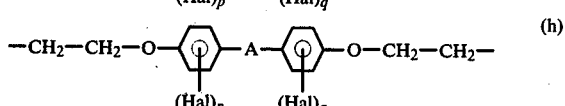

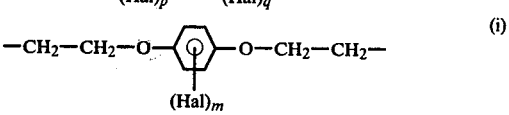

Y is zero or an integer 1 to 100,
A is a covalent bond, $(C_{1-4})$alkylene, $-CH(C_6H_5)-$, $-O-$, $-S-$ or $-SO_2-$, each X, independently, is oxygen or sulphur,
n is zero or 1,
m is zero or an integer 1 to 4
each p and each q, independently, is zero, 1 or 2 and each Hal, independently, is chlorine or bromine, with the provisos (i) that only at the most one of the groups (a) and (b) can be linked to any phosphorus atom via an oxygen atom, (ii) that when y in a radical (e) is an integer 1 to 100, each of $R_1$ and $R_1'$, independently, can also signify a group $-R_7OH$, (iii) that when an oxygen atom is attached to the phosphorus atom in any radical (d), including a radical (d) in any group (a) or (b), $R_5$ or $R_6$ in that radical (d) is other than alkyl, chloromethyl or bromomethyl when $R_6$ or $R_5$, respectively, therein is chloromethyl or bromomethyl, and (iv) that per molecule at the most one radical (e) can be present, and (b) a haloalkyl aryl ether, of which the aryl radical is unsubstituted or substituted with one or more halogen atoms.

The flameproofing composition of the present invention may optionally additionally comprise other components, e.g.

(c) a higher molecular weight, chlorinated aliphatic hydrocarbon, and/or (d) an organo tin or organo lead compound.

In the compounds of formula I, when $R_1$, $R_2$ or $R_3$ is alkyl, this preferably contains 4 to 18 carbon atoms, and when each of $R_1$, $R_2$ and $R_3$ is alkyl, the sum of the carbon atoms is preferably 24 to 54.

When any of $R_1$, $R_2$ and $R_3$ is cycloalkyl, this is preferably cyclohexyl, of which preferably at the most one is present per molecule.

When any of $R_1$, $R_2$ and $R_3$ is substituted phenyl or substituted phenyl-($C_{1-4}$)alkyl, there are preferably one or two substituents, or more preferably there is one substituent, on the phenyl nucleus. Any alkyl substituent preferably contains 1 to 9 carbon atoms or more preferably 1, 4, 5 or 9 carbon atoms. If any $R_1$, $R_2$ and $R_3$ is halo- or alkyl- substituted phenyl further substituted with a ($C_{1-8}$)alkyl- substituted phenyl radical, each phenyl nucleus preferably bears an alkyl substituent, more preferably butyl. Most preferably the optionally substituted biphenylyl radical signified by any of $R_1$, $R_2$ or $R_3$ is unsubstituted. The preferred optionally substituted phenyl or phenyl-($C_{1-4}$) alkyl radical is phenyl or benzyl, respectively. Any halogen substituent in $R_1$, $R_2$ or $R_3$ is either chlorine or bromine, of which bromine is preferred.

Of all the significances, alkyl, optionally substituted phenyl and the groups (a) and (b) are the preferred significances for $R_1$.

When any $R_4$ is alkyl, this is preferably methyl. Preferably one $R_4$ on a carbon atom in the group (c) is hydrogen and the other on the same carbon atom is alkyl.

$r_5$ is preferably alkyl, chloromethyl or bromomethyl more preferably alkyl, the preferred alkyl being methyl.

$R_6$ is preferably alkyl, chloromethyl, bromomethyl or, when $R_5$ is alkyl, also a group (f), more preferably alkyl, chloromethyl or bromomethyl or most preferably, alkyl. The preferred alkyl is methyl.

When $R_7$ is ($C_{1-4}$)alkylene-1,4-phenylene-($C_{1-4}$)alkylene, the ($C_{1-4}$)alkylene moieties may be straight or branched chain, and, when alkylene, this preferably contains 12 to 18 or most preferably 16 or 18 carbon atoms. When $R_7$ is cyclohexylene, this is preferably 1,4-cyclohexylene, and when phenylene, preferably 1,2- or 1,4-phenylene, more preferably 1,4-phenylene. Preferably $R_7$ is alkylene, phenylene or a group (g), (h) or (i), more preferably alkylene, phenylene or a group (g), still more preferably alkylene or phenylene, or most preferably alkylene. In the groups (g) and (h), signified by $R_7$, and (b), A is preferably a covalent bond, alkylene or —O—, more preferably a covalent bond or alkylene. The ($C_{2-4}$)alkylene radical, signified by A, may be straight or branched chain, and is preferably —CH$_2$—CH$_2$— or —C(CH$_3$)$_2$—, or more preferably the latter radical.

y is preferably zero or 1 to 50, more preferably zero or 1 to 19, still more preferably zero, 1, 2 or 3, and most preferably zero.

The preferences for $R_1'$, in the group (e), are the same as those given above for $R_1$.

n is preferably zero.

All the moieties X in the molecule of formula I preferably have the same meaning, oxygen or sulphur, and any X is preferably oxygen. Most preferably, all the moieties X are oxygen.

The preferred halogen for any moiety Hal is bromine, and more preferably all the moieties Hal in the molecule of formula I are bromine.

Each of p and q in any group (b), (g) or (h) is preferably 2.

m, in the group (a), is preferably zero, in the group (i) preferably 4.

$R_2$ and $R_3$ preferably form together with both the oxygen atoms to which they are attached and the common phosphorus atom a radical of formula (d) or (e). Of the compounds containing a radical (d) or (e), those containing two phosphorus atoms per molecule are more preferred, especially those containing two 1,3-dioxaphosphorinane rings or a 3,5,8,10-tetraoxa-4,9-diphosphaspiro-undecane group. Most preferably the compounds of formula I contain a radical (e), in which case $R_1$ is preferably other than a group (a) or (b).

Preferably the component (b) of the flameproofing composition is selected from compounds of formula II,

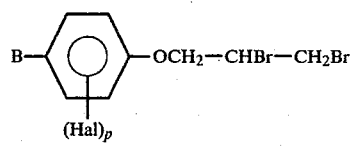

in which B is Hal or a group of formula (k),

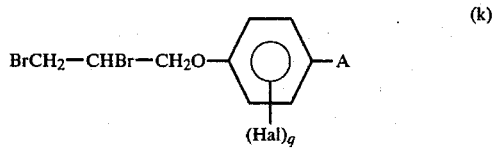

and Hal, p, q and A are as defined above.

In the compounds of formula II, Hal, p, q and A have the preferred significances indicated above in relation to these moieties in formula I.

Of the compounds of formula II, those of formulae IIa and IIb are most preferred.

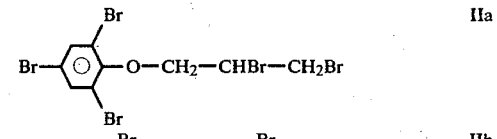

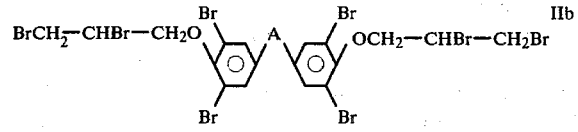

Preferably the component (c), when present in the flameproofing composition, is selected from chlorinated aliphatic hydrocarbons containing on average at least 10 carbon atoms and at least 5 chlorine atoms. More preferably, it is selected from chloroparaffins with an average chain length of 35–40 carbon atoms, polyvinyl chloride, polyvinylidene chloride and chlorinated polyethylene.

When the component (d) is present in the flameproofing composition, this is preferably selected from di($C_{1-8}$) alkyl tin carboxylates, di($C_{1-8}$)alkyl tin mercaptides and lead carboxylates.

Preferred examples of the lead carboxylates are lead stearate and lead phthalate.

Most preferably, the component (d) is selected from dibutyl tin maleate, dioctyl tin laurate and dibutyl tin mercaptide.

The compounds of formulae I and II are either known, or can be produced by known methods from available starting materials.

In the preferred flameproofing compositions of the present invention, i.e. those containing one or more compounds of formula I and one or more compounds of formula II, the ratio of compound(s) of formula I: compound(s) of formula II is preferably 1:5 to 3:1, more preferably 1:3 to 2:1 and most preferably 1:3 to 1:1 by weight. When the component (c) is also present, the ratio of component (c): compound(s) of formula II is preferably 1:5 to 5:1 and more preferably 1:2 to 2:1 by weight. With the component (d) present, the ratio of component (d): sum of compound(s) of formula I and compound(s) of formula II is preferably 1:30 to 1:3 more preferably 1:20 to 1:4, still more preferably 1:15 to 1:10, and most preferably approximately 1:15 by weight.

The flameproofing compositions of the present invention are useful for the flameproofing of polymeric organic materials and are notable for displaying a greater flameproofing effect than would be expected from the known flameproofing effects of the individual components (a) and (b).

Accordingly the present invention further provides a method of flameproofing a polymeric organic material comprising treating such material with a flamproofing effective amount of a composition of the present invention, as defined above, or separated with the individual components of said composition. By the term "treating" is meant either applying on the surface of the substrate to be flamproofed or incorporating, directly or indirectly, into the body thereof in conventional manner.

Also provided by the present invention is a polymeric organic material flameproofed by the method of the present invention, as defined above.

The method of the present invention is particularly suitable for the flameproofing of synthetic polymeric organic materials, more especially polypropylene, polyethylene, polystyrene and acrylonitrile-butadiene-styrene terpolymers, of which polypropylene is preferred. The flameproofed materials may be in the form of moulding or spinning masses as well as in the form of moulded or extruded articles and sheets.

The amount of flameproofing composition used or present in the method or flameproofed polymeric organic material, respectively, is preferably 1 to 9%, and more preferably 2 to 4% by weight of the material to be flameproofed.

Other agents may be added with the flameproofing composition or individual components thereof besides the components (a), (b) and optionally (c) and/or (d) in the method, especially stablizers against the degradative effects of light.

The present invention further provides a flameproofing master batch composition which comprises the flameproofing composition of the present invention and a part of the substrate to be treated by the method of the present invention. Such a master batch composition is a form of the flameproofing composition conveniently useable in the method, since it avoids the necessity for those engaged in practicing the method to initially make up the composition according to recommended ratio specifications before addition to the substrate to be flameproofed, and the master batch composition is readily worked into or applied onto the main body of the substrate by virtue of the presence of the same substrate in the master batch composition. The master batch composition may consist, for example, of a polyolefin which contains 20 to 80, or more preferably 40 to 70% by weight of the flameproofing composition.

In the following Examples, which illustrate the present invention, the parts and percentages are by weight and the temperatures are expressed in degrees Centigrade.

EXAMPLE 1

97 Parts of commercial polypropylene (melt flow index 5 at 230° and 2.16 kg/sq cm pressure) are premixed with 1 part of the compound of formula (a),

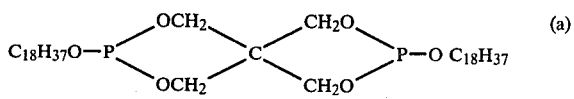

2 parts of the compound of formula (b),

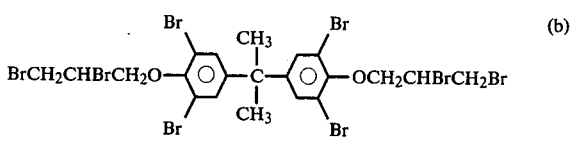

and 0.2 parts of dibutyl tin maleate in a rolling flask, and then the whole is intimately mixed at 165°–175° for 3 minutes in a laboratory rolling mill (Schwabenthan). The resulting sheet of the mixture is cut up into discs of 1 mm thickness in a press (Bucher-Guyer) at 230° within a period of 3 minutes, and the limiting oxygen index (LOI) determined. This is found to be 23.6, as compared with 17.5 for similar discs of commercial polypropylene not containing the flame-proofing composition.

Another sample of the flameproofed polypropylene is submitted to the vertical test according to DIN 53438; class 1/1mm, in which the sample self-extinguished within 2 seconds of the removal of the flame.

EXAMPLE 2

When the dialkyl tin maleate of Example 1 is replaced by a dialkyl tin mercaptide (Irgastab T36) and the procedure thereof repeated, the sample discs obtained are found to have a LOI of 23.8.

EXAMPLE 3

97 parts of commercial polypropylene (melt flow index 5 at 230°, 2.16 kg/sq cm pressure) are mixed with 1.5 parts of the compound of formula (a) and 1.5 parts of the compound of formula (b) as given in Example 1, and the resulting discs tested as described in Example 1. Good results are obtained.

EXAMPLE 4

97 parts of commercial polypropylene (melt flow index 5 at 230°, 2.16 kg/sq cm pressure), 1.5 parts of the compound of formula (a), 0.5 parts of the compound of formula (b) and 1 part of a waxy chloro paraffin with approximately 40-50 carbon atoms and approximately 20 chlorine atoms, on average, per molecule are mixed and the resulting discs tested as described in Example 1. Good results are obtained.

EXAMPLES 5 to 7

In a similar manner as described in Example 1 the following compositions are produced and tested:

| Example No. | Constituents |
|---|---|
| 5 | 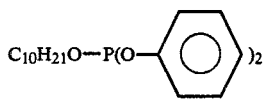<br>Compound of formula (b), as given in Example 1<br>Chloro paraffin as in Example 4 |
| 6 | 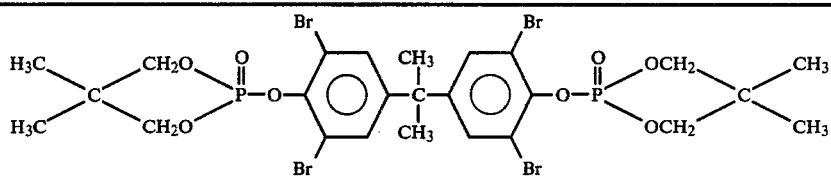<br>Compound of formula (b), as given in Example 1<br>Chloro paraffin as in Example 4 |
| 7 | 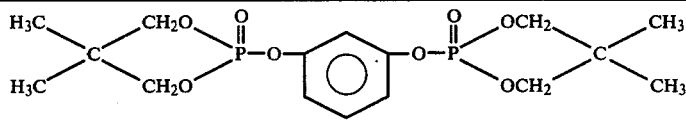<br>Compound of formula (b), as given in Example 1<br>Chloro paraffin as in Example 4 |

The weight ratios of the constituents are those given for the constituents in Example 1. Further samples are prepared using the weight ratios as follows: 2:1:0, 1:2:0, 2:1:0.5, 2:0.5:0.5, 1:2:0.5, 1:1:1 and 1:1:2.

EXAMPLES 8 and 9:

In a similar manner as described in Example 3 the following compositions are produced.

and 0.2 parts of a dialkyl tin mercaptide (Irgastab T 36) in a rolling flask, and then the whole is intimately mixed at 165°–175° for 3 minutes in a laboratory rolling mill (Schwabenthan). The resulting sheet of the mixture is cut up into discs of 1 mm thickness in a press (Bucher-Guyer) at 230° within a period of 3 minutes and the limiting oxygen index (LOI) determined. This is found to be 23.1 as compared with 17.5 for similar discs of

| Example No. | Constituents |
|---|---|
| 8 | 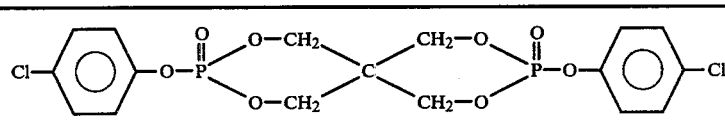<br>Compound of formula (b), as given in Example 1 |
| 9 | 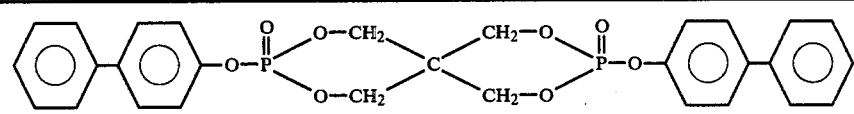<br>Compound of formula (b), as given in Example 1 |

EXAMPLE 10

97 Parts of commercial polypropylene (melt flow index 5 at 230° and 2.16 kg/sq cm pressure) are pre-mixed with 1 part of the compound of formula (a),

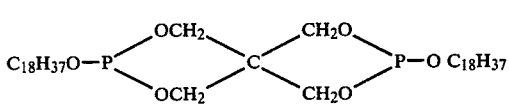 (a)

2 parts of the compound of formula (b'),

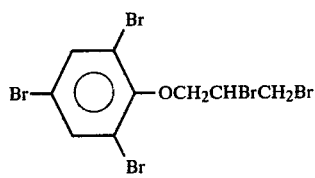 (b')

commercial polypropylene not containing the flameproofing composition.

Another sample of the flameproofed polypropylene is submitted to the vertical test according to DIN 53438; class 1/1mm, in which the sample self-extinguished within 1 second of the removal of the flame.

What is claimed is:

1. A flameproofing composition comprising:
(a) at least one compound of formula I,

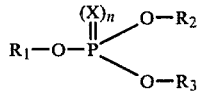 I in which
$R_1$ is $(C_{1-18})$ alkyl; $(C_{5-8})$ cycloalkyl; unsubstituted phenyl; phenyl mono-, di- or trisubstituted by halo; phenyl mono-, di- or trisubstituted by $(C_{1-12})$ alkyl, the total number of carbon atoms thereof not exceeding 12; phenyl mono-, di- or trisubstituted by halo and monosubstituted by unsubstituted phenyl; phenyl mono-, di- or trisubstituted by halo and monosubstituted by phenyl monosubstituted by $(C_{1-8})$ alkyl; phenyl mono-, di- or trisubstituted by $(C_{1-12})$ alkyl, the total number of carbon atoms thereof not exceeding 12, and monosubstituted by unsubstituted phenyl; phenyl mono-, di- or trisubstituted by $(C_{1-12})$ alkyl, the total number of carbon atoms thereof not exceeding 12, and monosubstituted by phenyl monosubstituted by $(C_{1-8})$ alkyl; phenyl monosubstituted by unsubstituted phenyl; phenyl monosubstituted by phenyl monosubstituted by $(C_{1-8})$ alkyl; unsubstituted phenyl-$(C_{1-4})$ alkyl; phenyl-$(C_{1-4})$ alkyl mono-, di- or trisubstituted by halo on the phenyl nucleus; phenyl-$(C_{1-4})$ alkyl mono-, di- or trisubstituted by $(C_{1-12})$ alkyl on the phenyl nucleus, the total number of carbon atoms thereof not exceeding 12; phenyl-$(C_{1-4})$ alkyl mono-, di- or trisubstituted by halo on the phenyl nucleus and monosubstituted by unsubstituted phenyl on the phenyl nucleus; phenyl-$(C_{1-4})$ alkyl mono-, di- or trisubstituted by halo on the phenyl nucleus and monosubstituted by phenyl monosubstituted by $(C_{1-8})$ alkyl, on the phenyl nucleus; phenyl-$(C_{1-4})$ alkyl mono-, di- or trisubstituted by $(C_{1-12})$ alkyl on the phenyl nucleus, the total number of carbon atoms thereof not exceeding 12, and monosubstituted by unsubstituted phenyl on the phenyl nucleus; phenyl-$(C_{1-4})$ alkyl mono-, di- or trisubstituted by $(C_{1-12})$ alkyl on the phenyl nucleus, the total number of carbon atoms thereof not exceeding 12, and monosubstituted by phenyl monosubstituted by $(C_{1-8})$ alkyl, on the phenyl nucleus; phenyl-$(C_{1-4})$ alkyl monosubstituted by unsubstituted phenyl on the phenyl nucleus; phenyl-$(C_{1-4})$ alkyl monosubstituted by phenyl monosubstituted by $(C_{1-8})$ alkyl, on the phenyl nucleus; or a group of formula (a) or (b), $$\begin{array}{c} R_2-O \\ R_3-O \end{array} \! P \! \begin{array}{c} (X)_n \\ \| \end{array} \! -O-\!\!\bigcirc\!\!-(Hal)_m \quad (a)$$

$$\begin{array}{c} R_5 \\ R_6 \end{array} \! C \! \begin{array}{c} CH_2-O \\ CH_2-O \end{array} \! P \! \begin{array}{c} (X)_n \\ \| \end{array} \! -O-\!\!\bigcirc\!\!-(Hal)_p -\!A\!-\!\!\bigcirc\!\!-(Hal)_q \quad (b)$$

either $R_2$ has one of the significances of $R_1$, and $R_3$ has one of the significances of $R_1$, or $R_2$ and $R_3$, or both sets of $R_2$ and $R_3$, as appropriate, form together with the oxygen atoms to which they are attached and the common phosphorus atom a radical of formula (c), (d), or (e), $$P \! \begin{array}{c} O-C(R_4)(R_4) \\ O-C(R_4)(R_4) \end{array} \quad (c)$$

$$P \! \begin{array}{c} O-CH_2 \\ O-CH_2 \end{array} \! C \! \begin{array}{c} R_5 \\ R_6 \end{array} \quad (d)$$

$$P \! \begin{array}{c} O\!-\!\!\begin{array}{c}CH_2\\CH_2\end{array}\!\! \\ O\!-\!\!\begin{array}{c}CH_2\\CH_2\end{array}\!\! \end{array} \! C \! \begin{array}{c} CH_2-O \\ CH_2-O \end{array} \! P \! \begin{array}{c} (X)_n \\ \| \end{array} \! -O- \quad (e)$$

$$-R_7-O-P \! \begin{array}{c} (X)_n \\ \| \end{array} \! \begin{array}{c} O\!-\!\!\begin{array}{c}CH_2\\CH_2\end{array}\!\! \\ O\!-\!\!\begin{array}{c}CH_2\\CH_2\end{array}\!\! \end{array}_y \! C \! \begin{array}{c} CH_2-O \\ CH_2-O \end{array} \! P \! \begin{array}{c} (X)_n \\ \| \end{array} \! -O-R_1'$$

each $R_4$, independently, is hydrogen or $(C_{1-4})$ alkyl;
$R_5$ is hydrogen; $(C_{1-4})$alkyl; chloromethyl; bromomethyl or phenyl;
$R_6$ is hydrogen; $(C_{1-4})$alkyl; chloromethyl; bromomethyl or, when $R_5$ is $(C_{1-4})$alkyl, also a group of formula (f), $$-CH_2-O-P \! \begin{array}{c} (X)_n \\ \| \end{array} \! \begin{array}{c} O-R_2 \\ O-R_3 \end{array} \quad (f)$$

with the proviso that in any radical (d) formed by $R_2$ and $R_3$, the oxygen atoms and the phosphorus atom in the group (f), $R_6$ is only hydrogen, $(C_{1-4})$ alkyl, chloromethyl or bromomethyl;
$R_1'$ has one of the significances of $R_1$;
$R_7$ is straight or branched chain $(C_{2-22})$ alkylene; cyclohexylene; phenylene; $(C_{1-4})$alkylene-1,4-phenylene-$(C_{1-4})$ alkylene, or a group of formula (g), (h) or (i), $$-\!\!\bigcirc\!\!-(Hal)_p -\!A\!-\!\!\bigcirc\!\!-(Hal)_q \quad (g)$$

$$-CH_2-CH_2-O-\!\!\bigcirc\!\!-(Hal)_p -\!A\!-\!\!\bigcirc\!\!-(Hal)_q -O-CH_2-CH_2- \quad (h)$$

$$-CH_2-CH_2-O-\!\!\bigcirc\!\!-(Hal)_m -O-CH_2-CH_2- \quad (i)$$

Y is zero or an integer 1 to 100;
A is a covalent bond; $(C_{1-4})$alkylene;

$-CH(C_6H_5)-$; $-O-$; $-S-$ or $-SO_2-$;

each X, independently, is oxygen or sulphur;
n is zero or 1;
m is zero or an integer 1 to 4;
each p and each q, independently, is zero, 1 or 2;
and each Hal, independently, is chloro or bromo;
with the provisos that: (i) at the most, only one of the groups (a) and (b) can be linked to any phosphorus atom via an oxygen atom; (ii) when y in a radical (e) is an integer 1 to 100, each of $R_1$ and $R_1'$, independently, can also signify a group $-R_7OH$; (iii) when an oxygen atom is attached to the phosphorus atom in any radical (d), including a radical (d) in any group (a) or (b), $R_5$ or $R_6$ in that radical (d) is other than alkyl, chloromethyl or bromomethyl when $R_6$ or $R_5$, respectively, therein is chloromethyl or bromomethyl; and (iv) at the most, only one radical (e) can be present per molecule; and (b) at least one haloalkyl aryl ether, the aryl ring(s) of
which is unsubstituted or substituted by 1 or more halo substituents.

2. A flameproofing composition according to claim 1 which, in addition to at least one compound of formula I and at least one haloalkyl aryl ether comprises: (c) a higher molecular weight, chlorinated aliphatic hydrocarbon and an organo tin or organo lead compound, of (d) a higher molecular weight, chlorinated aliphatic hydrocarbon or an organo tin or organo lead compound.

3. A flameproofing composition according to claim 2, in which the organo tin compound is selected from $di(C_{1-8})$ alkyl tin carboxylates and $di(C_{1-8})$ alkyl tin mercaptides, and the organo lead compound is a lead carboxylate.

4. A flameproofing composition according to claim 3 which, in addition to at least one compound of formula I and at least one haloalkyl aryl ether, comprises: (c) a higher molecular weight, chlorinated aliphatic hydrocarbon and an organo tin compound, or (d) a higher molecular weight, chlorinated aliphatic hydrocarbon or an organo tin compound, said organo tin compound being selected from dibutyl tin maleate, dioctyl tin laurate and dibutyl tin mercaptide.

5. A flameproofing composition according to claim 2, comprising:
(a) as the compound of formula I, a compound of formula,

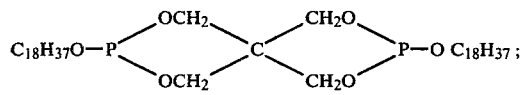

(b) as the haloalkyl aryl ether, a compound of formula,

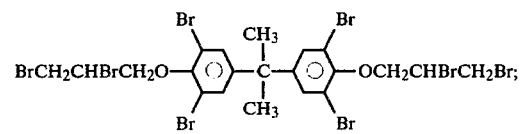

(c) an organo tin compound selected from dibutyl tin maleate and $di(C_{1-8})$ alkyl tin mercaptides.

6. A flameproofing composition according to claim 2 comprising:
(a) as the compound of formula I, a compound of formula,

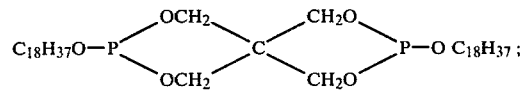

(b) at least one haloalkyl aryl ether; and (c) an organo tin compound selected from dibutyl tin maleate and $di(C_{1-8})$ alkyl tin mercaptides.

7. A flameproofing composition according to claim 2, in which each of $R_5$ and $R_6$, independently, is $(C_{1-4})$ alkyl and $R_7$ is $(C_{2-22})$alkylene, phenylene or a group (g), (h) or (i), and in which an organo tin or organo lead compound is present.

8. A flameproofing composition according to claim 2, in which the chlorinated aliphatic hydrocarbon is selected from chloroparaffins with an average chain length of 35 to 40 carbon atoms, polyvinyl chloride, polyvinylidine chloride and chlorinated polyethylene.

9. A flameproofing composition according to claim 1, in which $R_1$ is $(C_{1-18})$ alkyl; unsubstituted phenyl; phenyl mono-, di- or trisubstituted by halo; phenyl mono-, di- or trisubstituted by $(C_{1-12})$ alkyl, the total number of carbon atoms thereof not exceeding 12; phenyl mono-, di- or trisubstituted by halo and monosubstituted by unsubstituted phenyl; phenyl mono-, di- or trisubstituted by halo and monosubstituted by phenyl monosubstituted by $(C_{1-8})$ alkyl; phenyl mono-, di- or trisubstituted by $(C_{1-12})$ alkyl, the total number of carbon atoms thereof not exceeding 12, and monosubstituted by unsubstituted phenyl; phenyl mono-, di- or trisubstituted by $(C_{1-12})$ alkyl, the total number of carbon atoms thereof not exceeding 12, and monosubstituted by phenyl monosubstituted by $(C_{1-8})$ alkyl; phenyl monosubstituted by unsubstituted phenyl; phenyl monosubstituted by phenyl monosubstituted by $(C_{1-8})$ alkyl; or a group of formula (a) or (b), and $R_2$ and $R_3$ form together with the oxygen atoms to which they are attached and the common phosphorus atom a radical of formula (d) or (e).

10. A flameproofing composition according to claim 9, in which $R_1$ is $(C_{4-18})$ alkyl, unsubstituted phenyl, or a group (a) or (b), $R_2$ and $R_3$ form together with the oxygen atoms to which they are attached and the common phosphorus atom a radical (d) or (e), each of $R_5$ and $R_6$, independently, is $(C_{1-4})$-alkyl, $R_1'$ is $(C_{4-18})$ alkyl or unsubstituted phenyl, y is zero, A is a covalent bond, $(C_{1-4})$ alkylene or —O—, each X, independently, is oxygen, m is zero, each p and each q is 2, and Hal is bromo.

11. A flameproofing composition according to claim 10, in which $R_2$ and $R_3$ form together with the oxygen atoms to which they are attached and the common phosphorus atom a radical (e).

12. A flameproofing composition according to claim 1, in which n is zero.

13. A flameproofing composition according to claim 1, comprising as the compound of formula I a compound of formula,

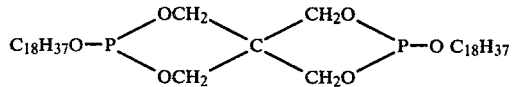

14. A flameproofing composition according to claim 1 comprising as the compound of formula I a compound of formula,

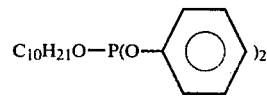

15. A flameproofing composition according to claim 1, comprising as the compound of formula I a compound of formula

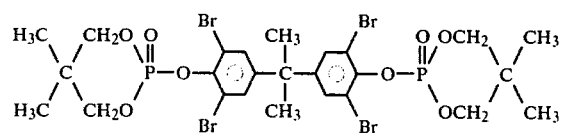

16. A flameproofing composition according to claim 1, comprising as the compound of formula I a compound of formula,

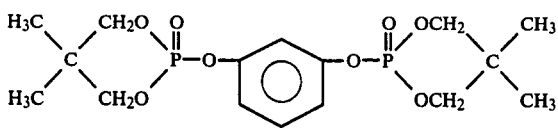

17. A flameproofing composition according to claim 1, comprising as the compound of formula I a compound of formula,

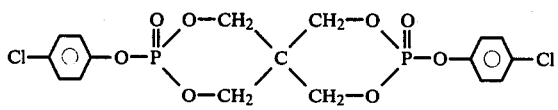

18. A flameproofing composition according to claim 1, comprising as the compound of formula I a compound of formula,

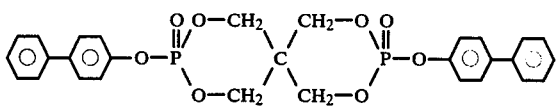

19. A flameproofing composition according to claim 1, in which the component (b) is a compound of formula II

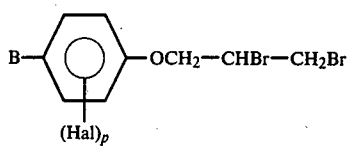

in which B is Hal or a group of formula (k),

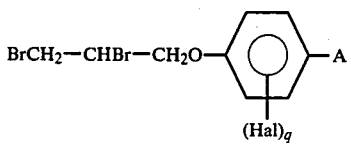

and Hal, p, q and A are as defined in claim 1.

20. A flameproofing composition according to claim 19, in which in the compound of formula II, A is a covalent bond, ($C_{1-4}$) alkylene or —O— p and q are each 2, and Hal is bromo.

21. A flameproofing composition according to claim 20, in which the compound of formula II is one of formula IIa or IIb,

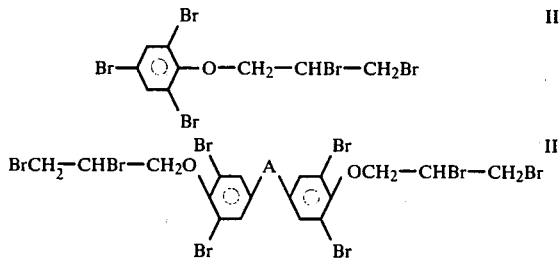

22. A flameproofing composition according to claim 19, in which the ratio of compound(s) of formula I: compound(s) of formula II is 1:5 to 3:1 by weight.

23. A flameproofing composition according to claim 22, in which the ratio is 1:3 to 1:1 by weight.

24. A flameproofing composition according to claim 19, in which the a chlorinated aliphatic hydrocarbon is present and the ratio of chlorinated aliphatic hydrocarbon : compound(s) of formula II is 1:5 to 5:1 by weight.

25. A flameproofing composition according to claim 24, in which the ratio is 1:2 to 2:1 by weight.

26. A flameproofing composition according to claim 19, in which an organo tin or organo lead compound is present and the ratio of said compound:sum of compound(s) of formula I and compound(s) of formula II is 1:30 to 1:3 by weight.

27. A flameproofing composition according to claim 26, in which the ratio is 1:15 to 1:10 by weight.

28. A flameproofing composition according to claim 1 comprising: (a) a compound of formula I; and (b) a haloalkyl aryl ether, the aryl ring of which is unsubstituted or substituted by one or more halo substituents.

29. A flameproofing master batch composition comprising a substrate and, as a flameproofing agent, a flameproofing effective amount of a composition according to claim 1.

30. A flameproofing master batch composition according to claim 29 comprising a substrate and, as a flameproofing agent, a flameproofing effective amount of a composition comprising: (a) a compound of formula I; and (b) a haloalkyl aryl ether, the aryl ring of which is unsubstituted or substituted by one or more halo substituents.

31. A flameproofing master batch composition according to claim 29, consisting of a polyolefin which contains 20 to 80% by weight of the flameproofing composition.

32. A flameproofing master batch composition according to claim 31, in which the polyolefin contains 40 to 70% by weight of the flameproofing composition.

33. A polymeric organic material containing, as a flameproofing agent, a flameproofing effective amount of a composition comprising: (a) at least one compound of formula I,

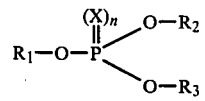

in which $R_1$ is ($C_{1-18}$) alkyl; ($C_{5-8}$) cycloalkyl; unsubstituted phenyl; phenyl mono-, di- or trisubstituted by halo; phenyl mono-, di- or trisubstituted by ($C_{1-12}$) alkyl, the total number of carbon atoms thereof not exceeding 12; phenyl mono-, di- or trisubstituted by halo and monosubstituted by unsubstituted phenyl; phenyl mono-, di- or trisubstituted by halo and monosubstituted by phenyl monosubstituted by ($C_{1-8}$) alkyl; phenyl mono-, di- or trisubstituted by ($C_{1-12}$) alkyl, the total number of carbon atoms thereof not exceeding 12, and monosubstituted by unsubstituted phenyl; phenyl mono-, di- or trisubstituted by ($C_{1-12}$) alkyl, the total number of carbon atoms thereof not exceeding 12, and monosubstituted by phenyl monosubstituted by ($C_{1-8}$) alkyl; phenyl monosubstituted by unsubstituted phenyl; phenyl monosubstituted by phenyl monosubstituted by ($C_{1-8}$) alkyl; unsubstituted phenyl-($C_{1-4}$) alkyl; phenyl-($C_{1-4}$) alkyl mono-, di- or trisubstituted by halo on the phenyl nucleus; phenyl-($C_{1-4}$) alkyl mono-, di- or trisubstituted by ($C_{1-12}$) alkyl on the phenyl nucleus, the total number of carbon atoms thereof not exceeding 12; phenyl-($C_{1-4}$) alkyl mono-, di- or trisubstituted by halo on the phenyl nucleus and monosubstituted by unsubstituted phenyl on the phenyl nucleus; phenyl-($C_{1-4}$) alkyl mono-, di- or trisubstituted by halo on the phenyl nucleus and monosubstituted by phenyl monosubstituted by ($C_{1-8}$) alkyl, on the phenyl nucleus; phenyl-($C_{1-4}$) alkyl mono-, di- or trisubstituted by ($C_{1-12}$) alkyl on the phenyl nucleus, the total number of carbon atoms thereof not exceeding 12, and monosubstituted by unsubstituted phenyl on the phenyl nucleus; phenyl-($C_{1-4}$) alkyl mono-, di- or trisubstituted by ($C_{1-12}$) alkyl on the phenyl nucleus, the total number of carbon atoms thereof not exceeding 12, and monosubstituted by phenyl monosubstituted by ($C_{1-8}$) alkyl, on the phenyl nucleus; phenyl-($C_{1-4}$) alkyl monosubstituted by unsubstituted phenyl on the phenyl nucleus; phenyl-($C_{1-4}$) alkyl monosubstituted by phenyl monosubstituted by ($C_{1-8}$) alkyl, on the phenyl nucleus; or a group of formula (a) or (b),

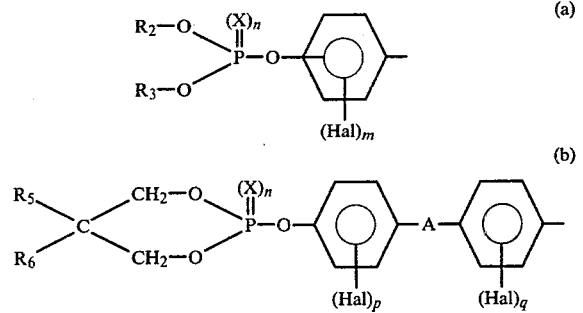

either $R_2$ has one of the significances of $R_1$, and $R_3$ has one of the significances of $R_1$, or $R_2$ and $R_3$, or both sets of $R_2$ and $R_3$, as appropriate, form together with the oxygen atoms to which they are attached and the common phosphorus atom a radical of formula (c), (d), or (e),

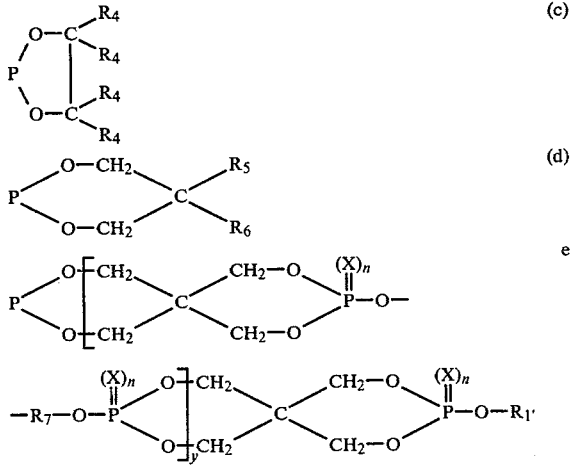

each
$R_4$, independently, is hydrogen or ($C_{1-4}$) alkyl;
$R_5$ is hydrogen; ($C_{1-4}$) alkyl; chloromethyl; bromomethyl or phenyl;

$R_6$ is hydrogen; ($C_{1-4}$) alkyl; chloromethyl; bromomethyl or, when $R_5$ is ($C_{1-4}$) alkyl, also a group of formula (f),

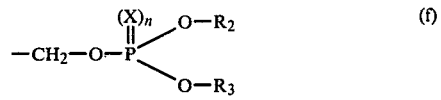

with the proviso that in any radical (d) formed by $R_2$ and $R_3$, the oxygen atoms and the phosphorus atom in the group (f), $R_6$ is only hydrogen, ($C_{1-4}$) alkyl, chloromethyl or bromomethyl;
$R_{1'}$ has one of the significances of $R_1$;
$R_7$ is straight or branched chain ($C_{2-22}$) alkylene; cyclohexylene; phenylene; ($C_{1-4}$) alkylene-1,4-phenylene-($C_{1-4}$) alkylene, or a group of formula (g), (h) or (i),

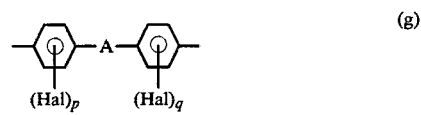

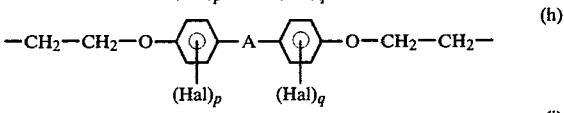

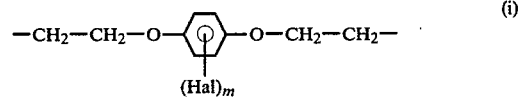

y is zero or an integer 1 to 100;
A is a covalent bond; ($C_{1-4}$) alkylene;

$-CH(C_6H_5)-$; $-O-$; $-S-$ or $-SO_2-$;

each X, independently, is oxygen or sulphur;
n is zero or 1;
m is zero or an integer 1 to 4;
each
p and each q, independently, is zero, 1 or 2;
and each Hal, independently, is chloro or bromo; with the provisos that: (i) at the most, only one of the groups (a) and (b) can be linked to any phosphorus atom via an oxygen atom; (ii) when y in a radical (e) is an integer 1 to 100, each of $R_1$ and $R_{1'}$, independently, can also signify a group -$R_7OH$; (iii) when an oxygen atom is attached to the phosphorus atom in any radical (d), including a radical (d) in any group (a) or (b), $R_5$ or $R_6$ in that radical (d) is other than alkyl, chloromethyl or bromomethyl when $R_6$ or $R_5$, respectively, therein is chloromethyl or bromomethyl; and (iv) at the most, only one radical (e) can be present per molecule; and (b) at least one haloalkyl aryl ether, the aryl ring(s) of which is unsubstituted or substituted by one or more halo substituents.

34. A polymeric organic material according to claim 33 containing, as a flameproofing agent, a flameproofing effective amount of a composition comprising: (a) a compound of formula I; and (b) a haloalkyl aryl ether, the aryl ring of which is unsubstituted or substituted by one or more halo substituents.

* * * * *

UNITED STATES PATENT AND TRADEMARK OFFICE
CERTIFICATE OF CORRECTION

PATENT NO. : 4,147,636

DATED : April 3, 1979

INVENTOR(S) : William O. Drake/Hans-Werner Finck/Horst Mayerhoefer/
Wolfgang H. Mueller It is certified that error appears in the above—identified patent and that said Letters Patent is hereby corrected as shown below:

Change the title to --FLAMEPROOFING COMPOSITIONS COMPRISING A TRIESTER OF PHOSPHOROUS, PHOSPHORIC OR THIOPHOSPHORIC ACID AND A HALOALKYL ARYL ETHER--.

Claim 1, Col. 10, line 50; change "Y" to --y--.

Claim 2, Col. 11, line 12; change "of" to --or--.

Signed and Sealed this

Twenty-ninth Day of April 1980

[SEAL]

Attest:

SIDNEY A. DIAMOND

Attesting Officer

Commissioner of Patents and Trademarks